(12) United States Patent
Lee et al.

(10) Patent No.: US 7,267,441 B2
(45) Date of Patent: *Sep. 11, 2007

(54) PROJECTION DISPLAY

(75) Inventors: Young-chol Lee, Gunpo-si (KR); Won-yong Lee, Suwon-si (KR); Kirill Sokolov, Suwon-si (KR); Kye-hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

This patent is subject to a terminal disclaimer.

(21) Appl. No.: 11/061,901

(22) Filed: Feb. 22, 2005

(65) Prior Publication Data

US 2005/0259224 A1    Nov. 24, 2005

(30) Foreign Application Priority Data

May 22, 2004   (KR) .................... 10-2004-0036638

(51) Int. Cl.
| | |
|---|---|
| G03B 21/14 | (2006.01) |
| G03B 21/28 | (2006.01) |
| G02B 6/10 | (2006.01) |
| G01D 11/28 | (2006.01) |
| F21V 7/04 | (2006.01) |

(52) U.S. Cl. ..................... 353/31; 353/94; 353/99; 353/102; 385/146; 385/901; 362/26; 362/551

(58) Field of Classification Search ............ 353/31, 353/94, 97–99, 102, 122; 385/146, 901; 362/26, 551, 582, 231; 313/372, 475

See application file for complete search history.

(56) References Cited

U.S. PATENT DOCUMENTS 5,146,248 A * 9/1992 Duwaer et al. ............. 353/122

(Continued)

FOREIGN PATENT DOCUMENTS

JP    2000-147658    5/2000

(Continued)

OTHER PUBLICATIONS

U.S. Appl. No. 11/061,632, filed on Feb. 22, 2005.

(Continued)

*Primary Examiner*—Melissa Jan Koval
(74) *Attorney, Agent, or Firm*—Stanzione & Kim, LLP

(57) ABSTRACT

A projection display including first through third light source units to radiate first through third light beams having different colors, respectively, a light path combining unit to combine paths of the first through third light beams, an optical modulator to sequentially modulate the first through third light beams according to image information, and a projection lens unit to magnify and project the modulated light beams onto a screen. The light path combining unit includes first and second prisms. The first prism includes first and second incidence surfaces, through which the first and second light beams are incident, respectively, a first emission surface, and a first selective reflection surface to transmit the second light beam toward the first emission surface. The second prism includes a third incidence surface, through which the third light beam is incident, a fourth incidence surface, through which the first and second light beams emitted through the first emission surface are incident, a second emission surface, and a second selective reflection surface to reflect the third light beam and to transmit the first and second light beams toward the second emission surface.

22 Claims, 8 Drawing Sheets

U.S. PATENT DOCUMENTS

| | | | | |
|---|---|---|---|---|
| 6,513,937 | B1* | 2/2003 | Dehmlow | 353/94 |
| 6,655,597 | B1* | 12/2003 | Swartz et al. | 235/462.45 |
| 6,857,761 | B2* | 2/2005 | Chang | 362/234 |
| 6,883,952 | B2* | 4/2005 | Sander | 362/575 |
| 7,014,318 | B2* | 3/2006 | Dho | 353/31 |
| 7,040,767 | B2* | 5/2006 | Lee et al. | 353/99 |
| 7,059,731 | B2* | 6/2006 | Lee et al. | 353/99 |
| 7,210,815 | B2* | 5/2007 | Imade | 362/234 |
| 2002/0080287 | A1* | 6/2002 | Yi et al. | 348/782 |
| 2002/0114157 | A1* | 8/2002 | Chuang et al. | 362/231 |
| 2006/0001984 | A1* | 1/2006 | Tani | 359/726 |

FOREIGN PATENT DOCUMENTS

| | | |
|---|---|---|
| JP | 2000-155291 | 6/2000 |
| JP | 2000-180962 | 6/2000 |
| JP | 2000-321529 | 11/2000 |
| JP | 2001-305657 | 11/2001 |
| JP | 2003-186110 | 7/2003 |
| JP | 2004-29770 | 1/2004 |
| JP | 2004-70018 | 3/2004 |
| JP | 2004-119364 | 4/2004 |
| KR | 1999-7132 | 1/1999 |
| KR | 20-0214699 | 12/2000 |
| KR | 2003-37567 A | 5/2003 |
| KR | 2003-38083 A | 5/2003 |
| KR | 2004-9312 A | 1/2004 |

OTHER PUBLICATIONS

U.S. Appl. No. 10/819,512.
U.S. Appl. No. 10/812,965.
U.S. Appl. No. 10/854,701.
Chinese Office Action dated Aug. 25, 2006 issued in CN 2005100709678.
Korean Office Action dated Nov. 28, 2005 issued in KR 2004-36638.

* cited by examiner

PROJECTION DISPLAY

CROSS-REFERENCE TO RELATED APPLICATIONS

This application claims the benefit of Korean Patent Application No. 10-2004-0036638, filed on May 22, 2004, in the Korean Intellectual Property Office, the disclosure of which is incorporated herein in its entirety by reference.

BACKGROUND OF THE INVENTION

1. Field of the Invention

The present general inventive concept relates to a projection display which modulates a plurality of light beams having different colors so as to be suitable for image information and magnifies and projects the modulated light beams to display a color image.

2. Description of the Related Art

Projection displays include optical modulators for modulating light to be suitable for image information and illumination units for illuminating the optical modulators. A metal halide lamp, a super-high voltage mercury lamp, or the like has been used in an illuminating unit. However, these lamps have short life spans of several thousands of hours at most. Hence, when conventional projection displays including these lamps are used, these lamps must be frequently replaced with new ones. Also, the illumination units need color wheels to divide white light emitted from these lamps into red (R), green (G), and blue (B) light beams, so the illumination units are enlarged.

Recently, projection displays adopting compact light sources such as light emitting diodes (LEDs) are under development. Japanese Patent Publication Nos. 2001-305657 and 2003-186110 disclose projection displays utilizing LEDs. LEDs emit relatively less light than a metal halide lamp or a super-high voltage mercury lamp. Accordingly, an array of LEDs is used as a light source of a projection display. To increase the amount of effective light incident upon a screen, light is collimated before light emitted from a LED is projected onto an optical modulator. In this case, light-condensing efficiency is degraded due to lenses that must be included in a condensing optical system.

SUMMARY OF THE INVENTION

The present general inventive concept provides a projection display including a compact illuminating optical system that has a long life span.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a projection display including first through third light source units to radiate first through third light beams having different colors, respectively, a light path combining unit to combine paths of the first through third light beams, an optical modulator to sequentially modulate the first through third light beams according to image information, and a projection lens unit to magnify and project the modulated light beams onto a screen. The light path combining unit includes first and second prisms. The first prism includes first and second incidence surfaces, through which the first and second light beams are incident, respectively, a first emission surface, and a first selective reflection surface to transmit the second light beam toward the first emission surface. The second prism includes a third incidence surface, through which the third light beam is incident, a fourth incidence surface, through which the first and second light beams emitted through the first emission surface are incident, a second emission surface, and a second selective reflection surface to reflect the third light beam and to transmit the first and second light beams toward the second emission surface.

A deflection prism to change a traveling direction of light may be disposed in at least one of spaces between the first light source unit and the first incidence surface, between the second light source unit and the second incidence surface, and between the third light source unit and the third incidence surface. An air gap may be formed on each of an incidence side and an emission side of the deflection prism.

Each of the first through third light source units includes at least one optical module. The optical module includes a collimator, having a first reflective surface in a parabolic shape, and a compact light source, located in the vicinity of a focal point of the first reflective surface. The collimator may further include a second reflective surface having a flat shape, located opposite to the first reflective surface, having a window through which light emitted from the compact light source enters. The collimator may further include a third reflective surface inclining with respect to the second reflective surface at an edge of the window. The second reflective surface may incline with respect to a principal axis of the first reflective surface. The compact light source may be disposed so that an optical axis of the compact light source inclines with respect to the principal axis at the same angle as an angle at which the second reflective surface inclines with the principal axis.

The foregoing and/or other aspects and advantages of the present general inventive concept are also achieved by providing a projection display including first through third light source units to radiate first through third light beams having different colors, respectively, a light path combining unit to combine paths of the first through third light beams, an integrator disposed on an emission side of the light path combining unit, to form a planar light having homogeneous light intensity, an optical modulator to sequentially modulate first through third light beams emitted from the integrator according to image information, and a projection lens unit to magnify and project the modulated light beams onto a screen. Each of the first through third light source units includes at least one optical module. The optical module includes a collimator having a first reflective surface in a parabolic shape, and a compact light source located in the vicinity of a focal point of the first reflective surface.

The light path combining unit includes first and second dichroic filters disposed in a V shape and reflecting the first and third light beams, respectively. The first and second light source units are disposed on a transmission side and a reflection side, respectively, of the first dichroic filter. The third light source unit is disposed on a reflection side of the second dichroic filter.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

Figure 1:
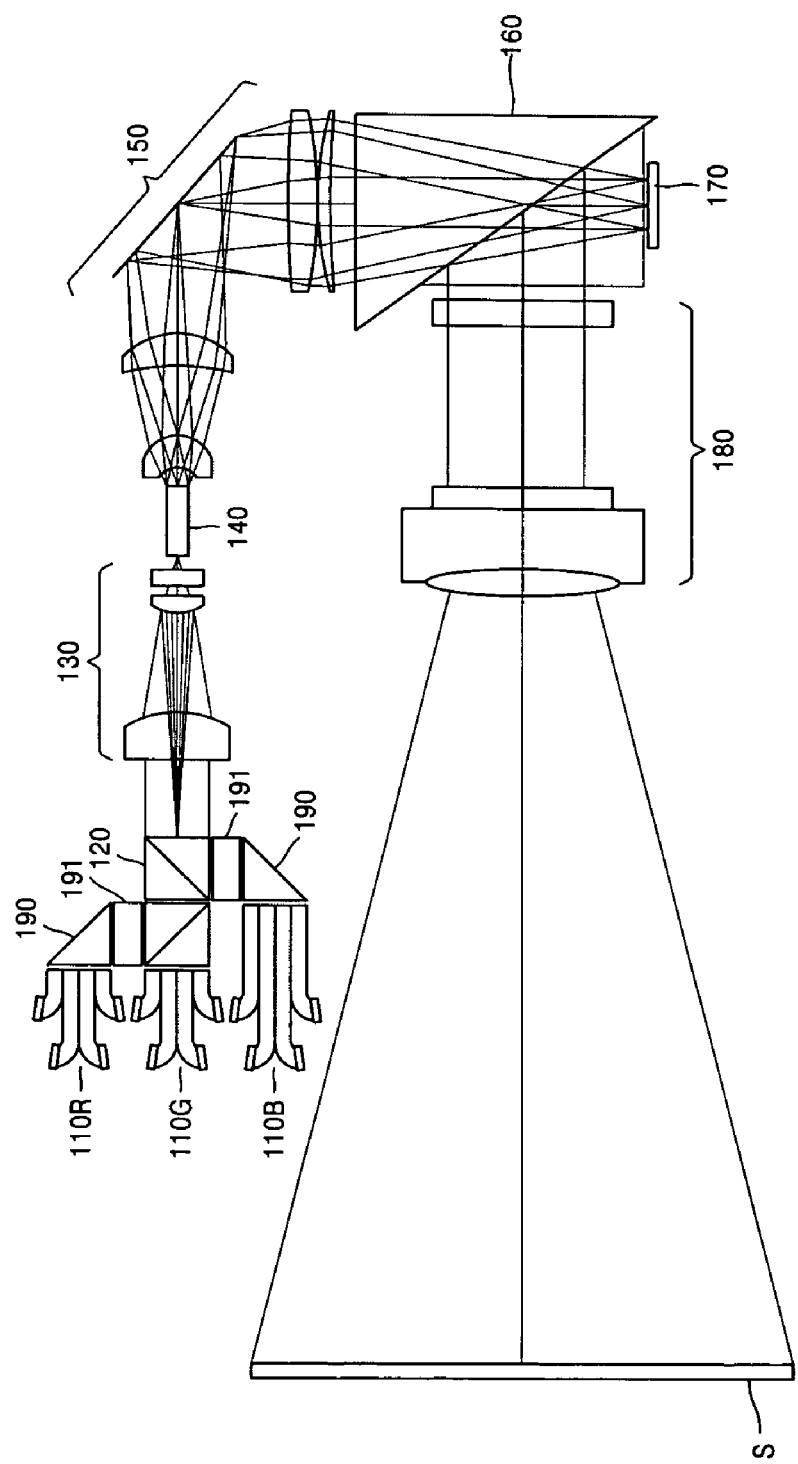
FIG. 1 is a schematic diagram illustrating a projection display according to an embodiment of the present general inventive concept.

DETAILED DESCRIPTION OF THE
PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 7:
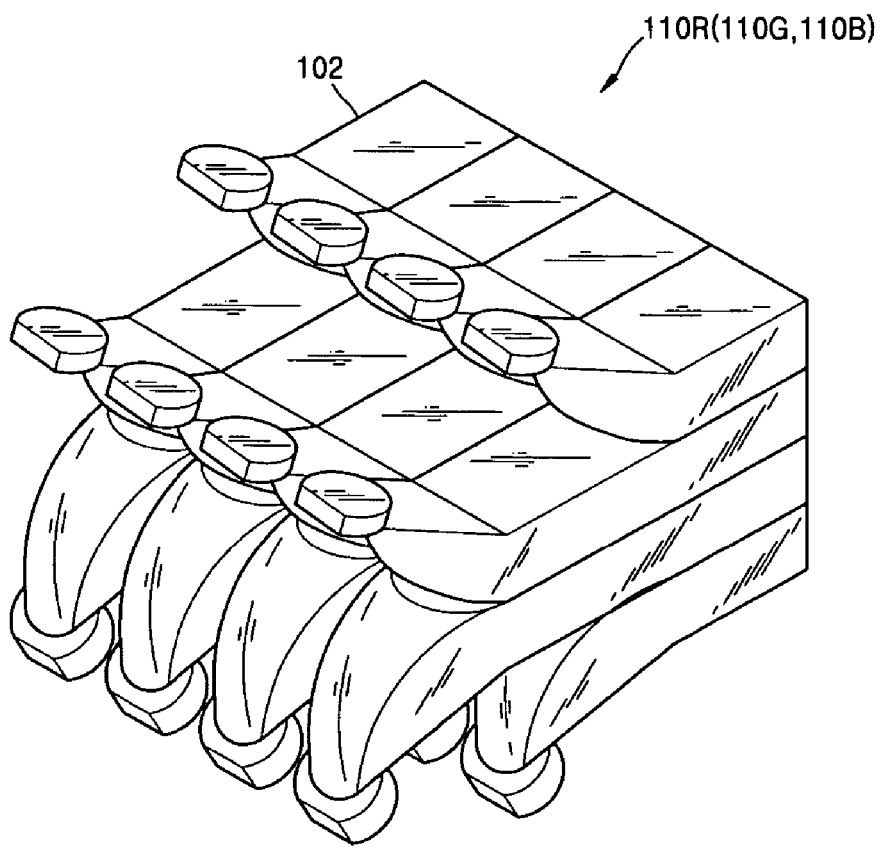
FIG. 7 is a perspective view of a light source unit which is an array of optical modules.

Referring to FIG. 1, a projection display according to an embodiment of the present general inventive concept includes first through third light source units 110R, 110G, and 110B, to emit first through third light beams R, G, and B, respectively, a light path combining unit 120, to combine light paths of the first through third light beams R, G, and B, an optical modulator 170 to sequentially modulate the first through third light beams R, G, and B according to image information, and a projection lens unit 180, to magnify and project modulated first through third light beams R, G, and B onto a screen S. This projection display is a single-panel projection display using a single optical modulator 170. The optical modulator 170 in the present embodiment is a digital micromirror device (DMD). As illustrated in FIG. 7, each of the first through third light source units 110R, 110G, and 110B is an array of a plurality of optical modules 101 of FIG. 2 or an array of optical modules 102 of FIG. 5.

Figure 2:
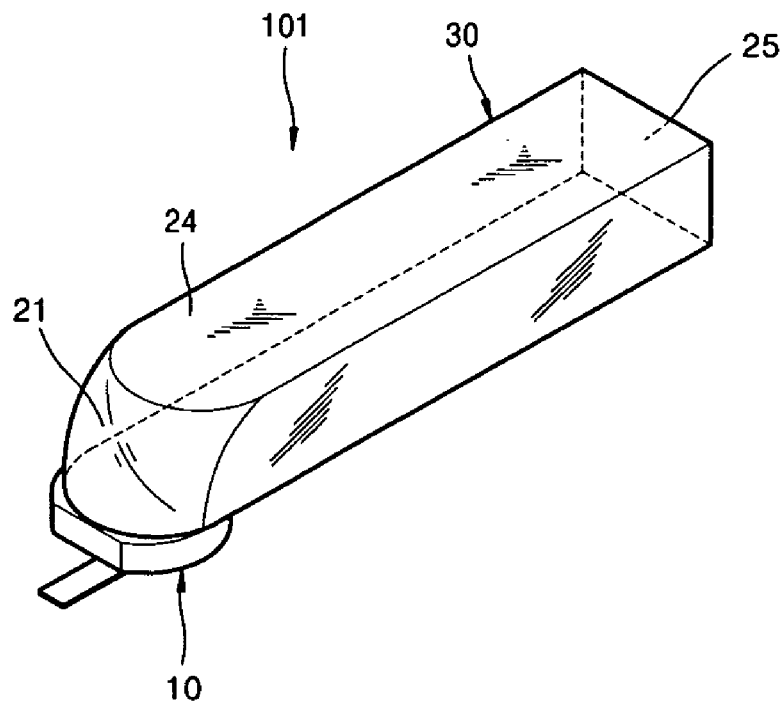
FIG. 2 is a perspective view of an optical module according to an embodiment of the present general inventive concept.
Figure 3:
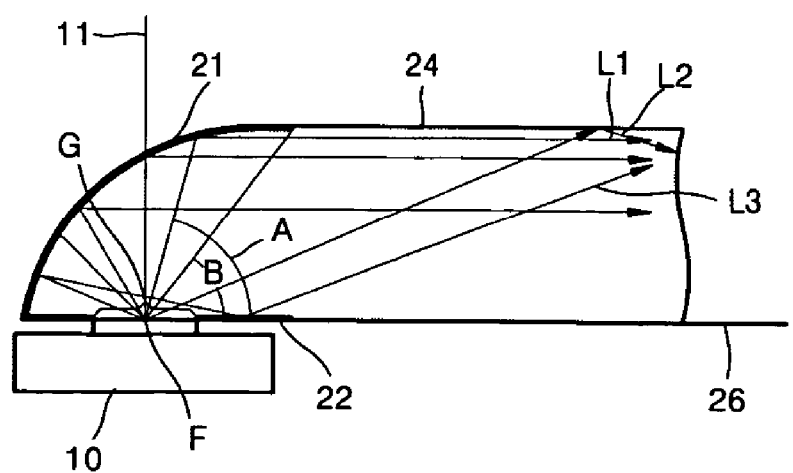
FIG. 3 is a side view of FIG. 2.
Figure 4:
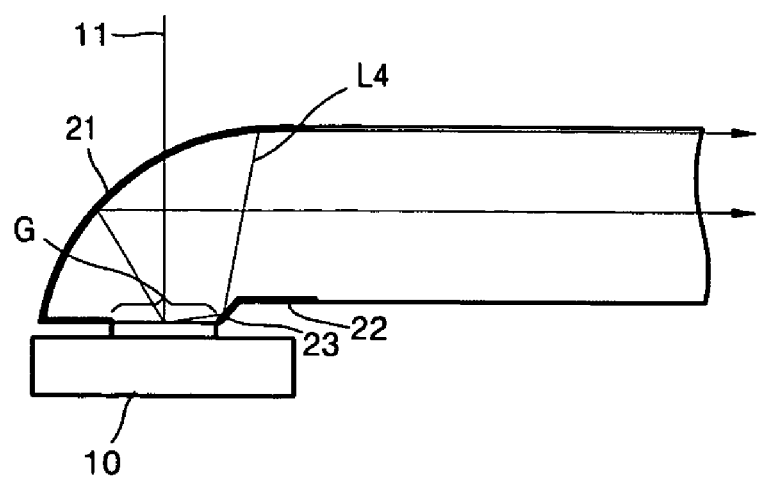
FIG. 4 is a side view of an optical module according to another embodiment of the present general inventive concept.

FIG. 2 is a perspective view of the optical module 101 according to an embodiment of the present general inventive concept. FIG. 3 is a side view of FIG. 2. Referring to FIGS. 2 and 3, the optical module 101 includes a collimator 30 and a compact light source 10. The compact light source 10 includes at least one LED, laser, or the like. The collimator 30 includes a first reflective surface 21 having a parabolic shape. The compact light source 10 is located in the vicinity of a focal point (F) of the first reflective surface 21. In the present embodiment, the first reflective surface 21 is formed by processing one end of a glass rod 24, which is a hexahedron, to have a parabolic surface and reflection-coating an exterior of the parabolic surface. The collimator 30 may further include a second reflective surface 22 having a plane shape. The second reflective surface 22 is formed such as to face the first reflective surface 21. The second reflective surface 22 has a window G, through which light is introduced from the compact light source 10. The second reflective surface 22 may be formed by performing a reflection treatment on a plane that faces the first reflective surface 21 of the glass rod 24 excluding the window G. In the present embodiment, the compact light source 10 is disposed so that its optical axis 11 is perpendicular to a principle axis 26. However, this does not limit the scope of the present general inventive concept. In another embodiment illustrated in FIG. 4, the collimator 30 may further include a third reflective surface 23 at an edge of the window G. The third reflective surface 23 is inclined with respect to the second reflective surface 22.

In the definition of the first reflective surface 21, a term "parabolic shape" is used, which does not denote only a parabola having a conic coefficient (K) of −1. The term "parabolic shape" used at least herein denotes an asphere having a K value of −0.4 to −2.5, and preferably, −0.7 to −1.6. The conic coefficient K of the first reflective surface 21 may be appropriately selected from the above-described range so as to collimate light emitted from the compact light source 10 within a radiation angle range that enables an object to be effectively illuminated with the light. Hereinafter, the first reflective surface 21 whose cross-sectional shape including the principle axis 26 is a parabolic shape having a K value of −1 will be described.

The compact light source 10 radiates light beams at a radiation angle A between about 0° and 180°. The first reflective surface 21 is parabolic, and the compact light source 10 is located in the vicinity of the focal point F. Thus, a light beam L1 radiated at a radiation angle A greater than an aperture angle B of the first reflective surface 21 is reflected by the first reflective surface 21 to be parallel with the principal axis 26. Due to total reflection by the first reflective surface 21, the first light beam L1 travels within the glass rod 24 and is emitted through a light emission surface 25. A light beam L2 radiated from the compact light source 10 at a radiation angle A smaller than the aperture angle B is not incident on the first reflective surface 21 but is directly propagated into the glass rod 24. Thus, the collimator 30 collimates a light beam that radiates from the compact light source 10 at the radiation angle A between 0° and 180°, so as to be emitted at an emission angle between 0° and the aperture angle B.

The compact light source 10 cannot be disposed so that a radiating point is located exactly at the focal point F. Thus, some of the light beams radiating from the compact light source 10 may be reflected by the first reflective surface 21 toward the second reflective surface 22 and not toward the glass rod 24. The second reflective surface 22 then reflects an incident beam L3 toward the light emission surface 25 so as to improve light efficiency. The third reflective surface 23 reflects a light beam L4, having a radiation angle smaller than the aperture angle B, toward the first reflective surface 21 so as to improve collimating efficiency.

The efficiency degradation of an optical system using lenses will now be described in greater detail with reference to FIGS. 12A and 12B, in which a single LED and an LED array are used, respectively. In a paraxial area, the product of the size and angle of an image is conserved. Thus, the product of the emission area of an LED and the steradian of the emission angle of the LED is a conservation value which is called an "etendue." When the etendue is less than the product of the area of an optical modulator and a steradian calculated from an F value of a projection lens unit, the light condensing efficiency increases.

Figure 12A:
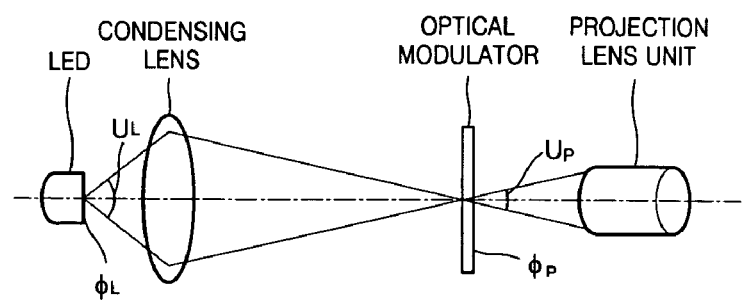
FIGS. 12A and 12B are views illustrating a degradation of a light condensing efficiency of an optical system that uses lenses.
Figure 12B:
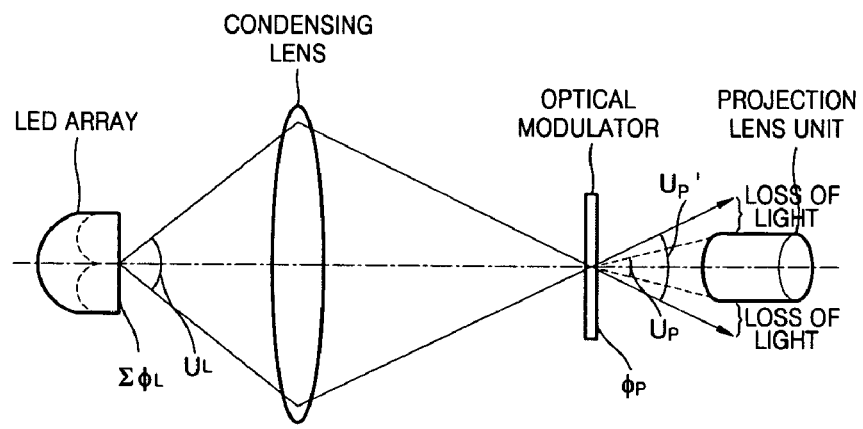

As shown in FIG. 12A, when the single LED is used, the product of the emission area $\Phi_L$ and the steradian $U_L$ of the LED may be equal to the product of the emission area $\Phi_P$ and the steradian $U_P$ of the optical modulator. As shown in FIG. 12B, when the LED array is used, the emission area $\Sigma\Phi_L$ of the LED array is larger than the emission area $\Phi_L$ of the single LED of FIG. 12A. Here, the steradian $U_L$ of the emission angle of the LED is equal to the steradian $U_L$ of the LED array, and the emission area $\Phi_P$ of the optical modulator of FIG. 12B is equal to the emission area $\Phi_P$ of the optical modulator of FIG. 12A. Therefore, in order to conserve the etendue, the steradian $U_P{'}$ of the emission angle of the optical modulator of FIG. 12B is larger than the steradian $U_P$ of the optical modulator of FIG. 12A. Accordingly, when the LED array as shown in FIG. 12B is used, light is lost, resulting in decreasing light condensing efficiency and the luminance of the projection display.

Instead of using lenses, the optical module 101 uses the first reflective surface 21 to collimate the light beams emitted from the compact light source 10. Hence, the light beams can be collimated with high efficiency without the efficiency degradation due to lenses. Since the optical module 101 can be designed to have a very small size, the light source units 110R, 110G, and 110B are smaller than conventional lamps, even though a plurality of optical modules 101 are arranged. Due to the collimating of light, the amount of light that can be effectively projected by the projection lens unit 180 is increased to thereby improve light efficiency.

Figure 5:
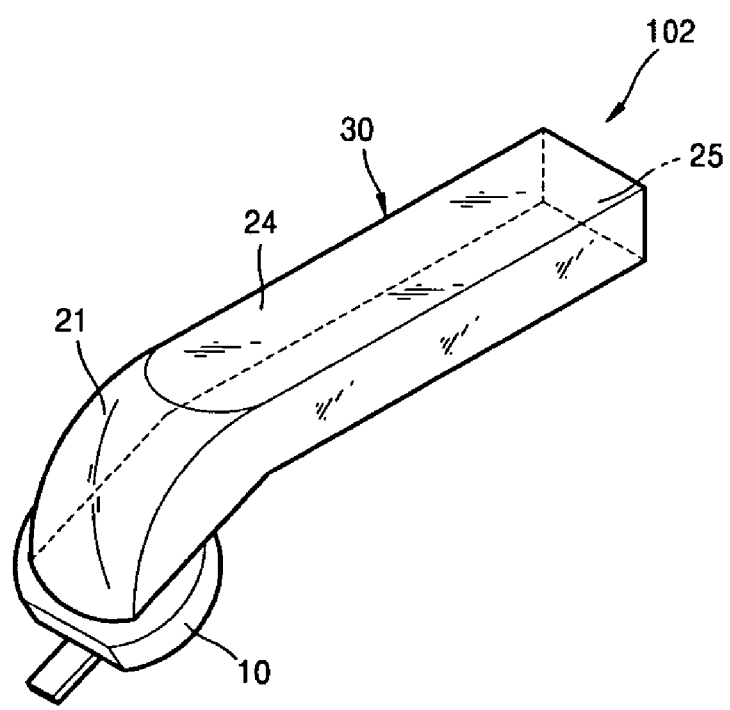
FIG. 5 is a perspective view of an optical module according to still another embodiment of the present general inventive concept.
Figure 6:
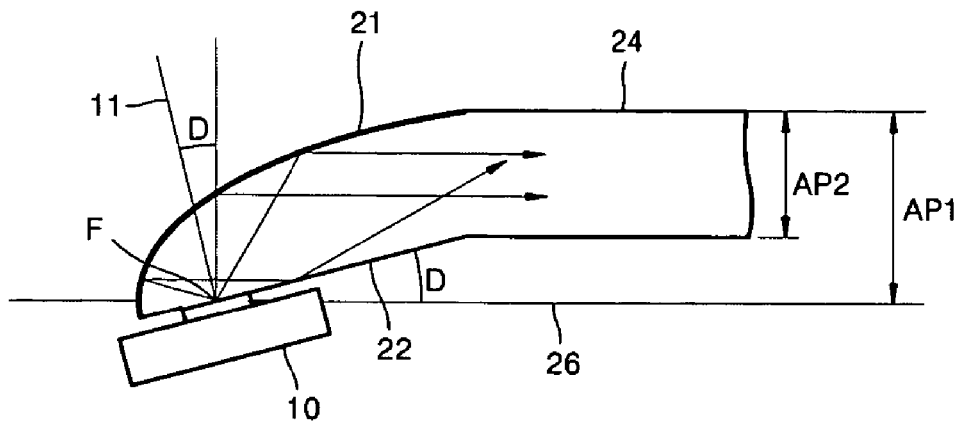
FIG. 6 is a side view of FIG. 5.

FIG. 5 is a perspective view of an optical module 102 according to still another embodiment of the present general inventive concept. FIG. 6 is a side view of FIG. 5. Referring to FIGS. 5 and 6, the optical module 102 has a second reflective surface 22, which is inclined with respect to the principle axis 26 of the first reflective surface 21 by an angle D. The compact light source 10 is installed so that the optical axis 11 is substantially or almost perpendicular to the second reflective surface 22. As a result, the optical axis 11 of the compact light source 10 inclines with respect to the principal axis 26 of the first reflective surface 21 by the angle D. Due to this structure, the size of an aperture of the optical module 102 can be reduced. Referring to FIG. 6, reference character AP1 denotes the size of the aperture of the optical module 101 shown in FIGS. 2 through 4, in which the second reflective surface 22 is parallel with the principal axis 26. Reference character AP2 denotes the size of the aperture of the optical module 102. As shown in FIG. 6, apparently, the size AP2 of the aperture of the optical module 102 is smaller than the size AP1 of the aperture of the optical module 101. The reduction in the size of an aperture is advantageous in that it allows an array of a plurality of compact optical modules 101 (or 102). In other words, since a lot of optical modules 102 can be arrayed in a narrow space, the amount of light emitted from each of the first through third light source units 110R, 110G, and 110B can be increased. Also, when having an identical light amount, the sizes of the first through third light source units 110R, 110G, and 110B can be reduced. Each of the first through third light source units 110R, 110G, and 110B shown in FIG. 7 is an array of optical modules 102.

In the above-described embodiments, each of the optical modules 101 and 102 uses the glass rod 24. Although not shown, the first and second reflective surfaces 21 and 22 are each formed by forming a parabolic surface on one end of a hollow optical tunnel and reflection-coating the interior of the parabolic surface.

Figure 8:
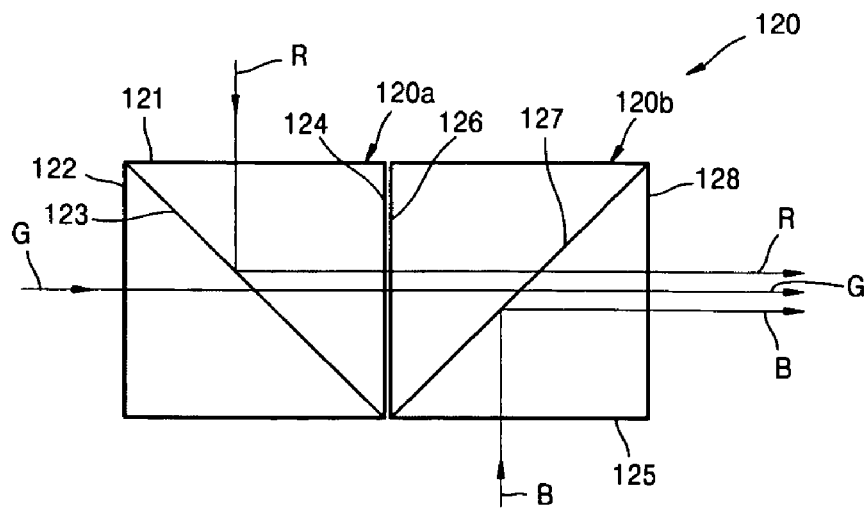
FIG. 8 is a view illustrating a structure of a light path combining unit according to an embodiment of the present general inventive concept.

FIG. 8 is a view illustrating a structure of the light path combining unit 120 in greater detail. The light path combining unit 120 includes first and second prisms 120a and 120b. The first prism 120a includes first and second incidence surfaces 121 and 122, through which first and second light beams R and G are incident, respectively, a first emission surface 124, and a first selective reflection surface 123, which reflects the first light beam R and transmits the second light beam G so that the first and second light beams R and G travel toward the first emission surface 124. A second prism 120b includes a third incidence surface 125, through which a third light beam B is incident, a fourth incidence surface 126, through which the first and second light beams R and G are incident, a second emission surface 128, and a second selective reflection surface 127, which reflects the third light beam B and transmits the first and second light beams R and G so that the first, second, and third light beams R, G, and B travel toward the second emission surface 128.

Figure 9A:
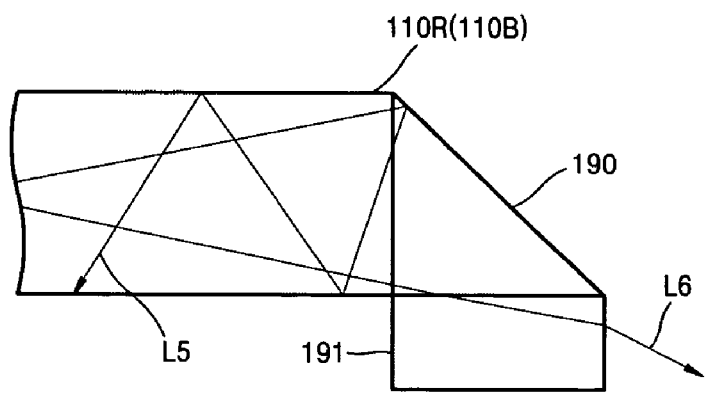
FIGS. 9A and 9B are views illustrating an operation of an air gap.
Figure 9B:
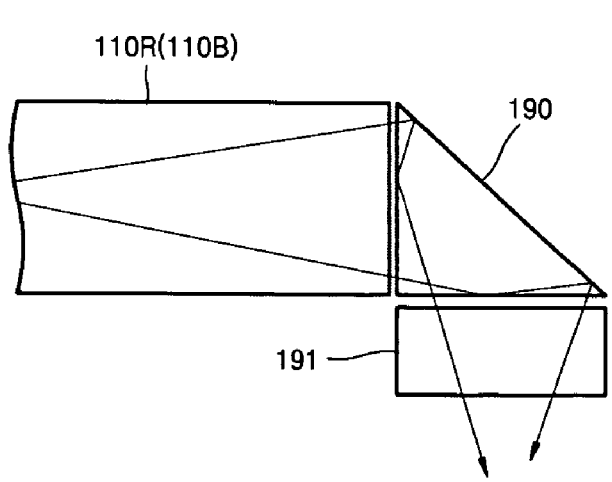

The first through third light beams R, G, and B emitted from the first through third light source units 110R, 110G, and 110B, respectively, are incident upon the first through third incidence surfaces 121, 122, and 125, respectively. Referring to FIG. 1, the first through third light source units 110R, 110G, and 110B are juxtaposed with one another. A deflection prism 190, to change a traveling direction of light so that the first light beam R is incident upon the first incidence surface 121, is installed between the first light source unit 110R and the first incidence surface 121. Another deflection prism 190, to change a traveling direction of light so that the third light beam B is incident upon the third incidence surface 125, is installed between the third light source unit 110B and the third incidence surface 125. Air gaps can be formed on incidence and emission sides of the deflection prism 190. Referring to FIG. 1, transparent light guide members 191 are installed between the deflection prism 190 and the first incidence surface 121 and between the other deflection prism 190 and the third incidence surface 125. In this case, the deflection prism 190 and the light guide member 191 are slightly distant from each other. Preferably, the light guide member 191 and the first incidence surface 121 are slightly distant from each other, and the other light guide member 191 and the third incidence surface 125 are slightly distant from each other. The air gaps prevent a light loss. When there are no air gaps as illustrated in FIG. 9A, a light beam L5 returning to the light source unit 110R (110B) and a light beam L6 penetrating the light guide member 191 and projecting outside is generated. When air gaps are formed as illustrated in FIG. 9B, a total reflection condition is established on virtue of a difference between refractive indices of an air gap and a deflection prism 190, such that light does not leak.

In this structure, the first light beam R is reflected by the first selective reflection surface 123, passes through the second selective reflection surface 127, and is then emitted through the second emission surface 128. The second light beam G passes through the first and second selective reflection surfaces 123 and 127 and is then emitted through the second emission surface 128. The third light beam B is reflected by the second selective reflection surface 127 and then emitted through the second emission surface 128. In this way, the paths of the first through third light beams R, G, and B are combined.

Light beams emitted from the light path combining unit 120 are incident upon an integrator 140. The integrator 140 forms a planar light having a homogeneous light intensity. The integrator 140 may be either a glass rod having rectangular cross-sections or an optical tunnel having an internal reflective surface. Referring to FIG. 1, the projection display further includes at least one condensing lens 130, to condense the light beams emitted from the light path combining unit 120 and to propagate the condensed light beams onto the integrator 140. The light beams emitted from the integrator 140 are incident upon the optical modulator 170 via a total internal reflection (TIR) prism 160. A relay lens 150 scales up or down the light beams emitted from the integrator 140 in accordance with an aperture of the optical modulator 170. The optical modulator 170 sequentially modulates the first through third light beams R, G, and B so as to correspond to image information. The modulated beams are guided by the TIR prism 160 toward the projection lens unit 180. The projection lens unit 180 magnifies and projects the modulated beams onto a screen S.

As described above, the projection display according to the embodiment of FIG. 1 uses the compact light source 10 to thereby accomplish life extension of the light source units 110R, 110B, and 110G. The light condensing efficiency can be improved by collimating light beams emitted from the light source units 110R, 110B, and 110G using the first reflective surface 21 instead of using lenses. The use of an array of a plurality of optical modules 101 (or 102) can increase the brightness of an image and also make the light source units 110R, 110B, and 110G compact. Since the paths of the light beams R, B, and G are combined by the two prisms 120a and 120b, a projection display having a simple structure can be obtained.

Figure 10:
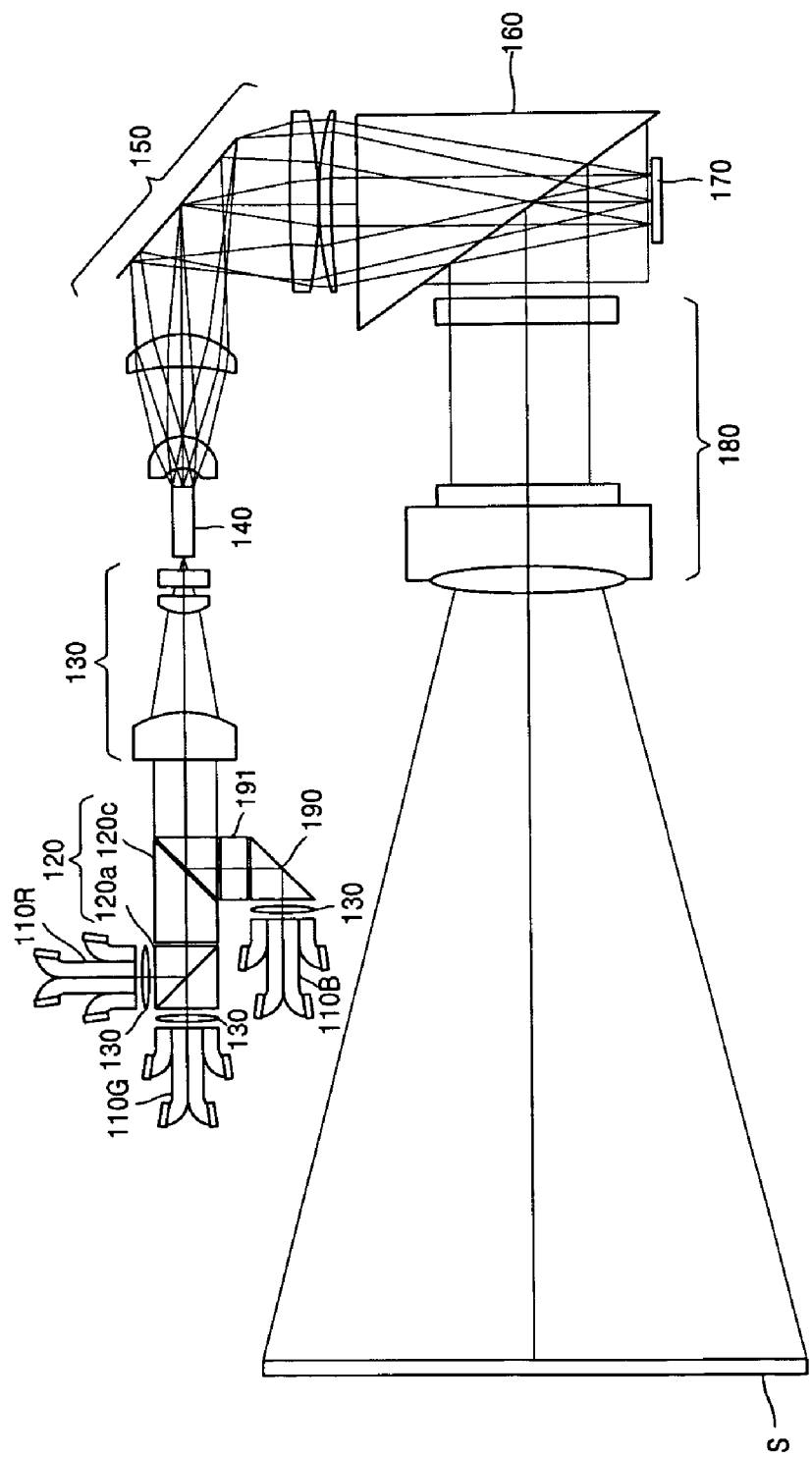
FIG. 10 is a schematic diagram illustrating a projection display according to another embodiment of the present general inventive concept.

FIG. 10 is a schematic diagram illustrating a projection display according to another embodiment of the present general inventive concept. The projection display according to the present embodiment is a modification of the previous embodiment of FIG. 1, so the operational effect of the present embodiment is almost the same as that of the previous embodiment. The light path combining unit 120 of FIG. 10 is the same as that shown in FIG. 8 except that a second prism 120c slightly longer than the second prism 120b of FIG. 8 is included. Referring to FIG. 10, the first light source unit 110R is located such as to emit the first light beam R directly to the first incidence surface 121. The second light source unit 110G emits the second light beam G directly to the second incidence surface 122. The third light source unit 110B emits the third light beam B to the third incidence surface 125 via a deflection prism 190 and a light guide member 191. Condensing lenses 130 are disposed between the first light source unit 110R and the first incidence surface 121, between the second light source unit 110G and the second incidence surface 122, and between the third light source unit 110B and the deflection prism 190. In this case, the paths of the first through third light beams R, G, and B from emission sides of the first through third light source units 110R, 110G, and 110B to the second emission surface 128 can have identical lengths so that the light beams emitted from the first through third light source units 110R, 110G, and 110B are condensed at an entrance of the integrator 140. The paths of the first through third light beams R, G, and B can have identical lengths due to the insertion of the deflection prism 190 and the light guide member 191 between the third light source unit 110B and the third incidence surface 125 and the use of the second prism 120c.

Figure 11:
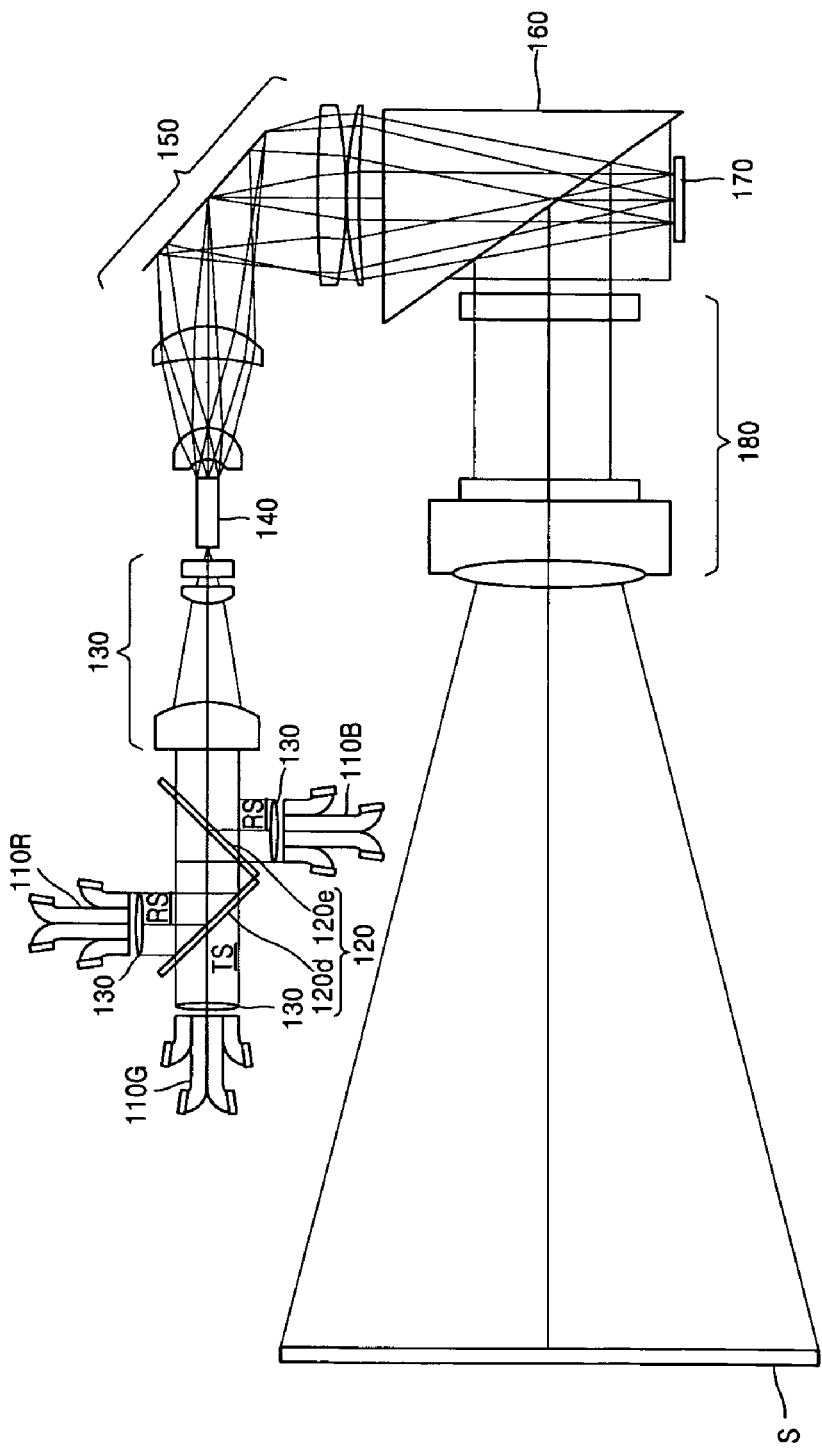
FIG. 11 is a schematic diagram illustrating a projection display according to still another embodiment of the present general inventive concept.

FIG. 11 is a schematic diagram illustrating a projection display according to still another embodiment of the present general inventive concept. This projection display is a modification of the embodiment of FIG. 10, so the operational effect of this embodiment is almost the same as that of the embodiment of FIG. 1. Referring to FIG. 11, the light path combining unit 120 includes first and second dichroic filters 120d and 120e, which are disposed in a V shape. The first and second light source units 110R and 110G are disposed on a transmission side (TS) and a reflection side (RS), respectively, of the first dichroic filter 120d, and the third light source unit 110B is disposed on a reflection side (RS) of the second dichroic filter 120e. The first dichroic filter 120d reflects the first light beam R and transmits the second light beam G. The second dichroic filter 120e transmits the first and second light beams R and G and transmits the third light beam B. After the light beams R, G, and B pass through the light path combining unit 120 in this way, they have an identical light path.

The projection displays according the aforementioned embodiments of the present general inventive concept have the following effects. First, the life spans of light source units are prolonged due to the use of a compact light source.

Second, light condensing efficiency is improved by the use of a collimator having an aspheric reflection surface to collimate light emitted from the compact light source.

Third, a single-panel projection display having a simple structure can be obtained by the use of prisms or dichroic filters to combine different paths of three color beams.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A projection display including first through third light source units radiating first through third light beams having different colors, respectively, a light path combining unit to combine paths of the first through third light beams, an optical modulator to sequentially modulate the first through third light beams according to image information, and a projection lens unit to magnify and project the modulated light beams onto a screen, the light path combining unit comprising:

a first prism including first and second incidence surfaces, through which the first and second light beams are incident, respectively, a first emission surface, and a first selective reflection surface to transmit the second light beam toward the first emission surface; and a second prism including a third incidence surface, through which the third light beam is incident, a fourth incidence surface, through which the first and second light beams emitted through the first emission surface are incident, a second emission surface, and a second selective reflection surface to reflect the third light beam and transmit the first and second light beams toward the second emission surface.

2. The projection display of claim 1, further comprising an integrator disposed on an emission side of the light path combining unit, to form a planar light having homogeneous light intensity.

3. The projection display of claim 2, further comprising at least one condensing lens to condense the first through third light beams and to propagate the condensed light beams to the integrator.

4. The projection display of claim 3, wherein the at least one condensing lens is disposed between the second emission surface and the integrator.

5. The projection display of claim 3, wherein at least one condensing lens is disposed at each of spaces between the first light source unit and the first incidence surface, between the second light source unit and the second incidence surface, and between the third light source unit and the third incidence surface.

6. The projection display of claim 1, wherein a deflection prism changing a traveling direction of light is disposed in at least one of spaces between the first light source unit and the first incidence surface, between the second light source unit and the second incidence surface, and between the third light source unit and the third incidence surface.

7. The projection display of claim 6, wherein an air gap is formed on each of an incidence side and an emission side of the deflection prism.

8. The projection display of claim 7, wherein:
the first through third light source units are juxtaposed; and
the deflection prism is disposed in each of the spaces between the first light source unit and the first incidence surface and between the third light source unit and the third incidence surface.

9. The projection display of claim 1, wherein the optical modulator is a digital micromirror device (DMD).

10. The projection display of claim 1, wherein each of the first through third light source units includes at least one optical module, the optical module comprises:
a collimator having a first reflective surface in a parabolic shape; and
a compact light source located in the vicinity of a focal point of the first reflective surface.

11. The projection display of claim 10, wherein the collimator further comprises a second reflective surface having a flat shape, located opposite to the first reflective surface, and has a window through which light emitted from the compact light source enters.

12. The projection display of claim 11, wherein:
the second reflective surface inclines with respect to a principal axis of the first reflective surface; and
the compact light source is disposed so that an optical axis of the compact light source inclines with respect to the principal axis at the same angle as an angle at which the second reflective surface inclines with the principal axis.

13. The projection display of claim 11, wherein the collimator further comprises a third reflective surface inclining with respect to the second reflective surface at an edge of the window.

14. The projection display of claim 6, wherein transparent light guide members are installed between a first deflection prism and the first incident surface, between a second deflection prism and the third incident surface.

15. A projection display including first through third light source units radiating first through third light beams having different colors, respectively, a light path combining unit to combine paths of the first through third light beams, an integrator disposed on an emission side of the light path combining unit, to form a planar light having homogeneous light intensity, an optical modulator to sequentially modulate first through third light beams emitted from the integrator according to image information, and a projection lens unit magnify and project the modulated light beams onto a screen, each of the first through third light source units comprising at least one optical module,
the optical module comprising:
a collimator having a first reflective surface in a parabolic shape; and
a compact light source located in the vicinity of a focal point of the first reflective surface.

16. The projection display of claim 15, wherein the collimator further comprises a second reflective surface having a flat shape, located opposite to the first reflective surface, and has a window through which light emitted from the compact light source enters.

17. The projection display of claim 16, wherein:
the second reflective surface inclines with respect to a principal axis of the first reflective surface; and
the compact light source is disposed so that an optical axis of the compact light source inclines with respect to the principal axis at the same angle as an angle at which the second reflective surface inclines with respect to the principal axis.

18. The projection display of claim 16, wherein the collimator further comprises a third reflective surface inclining with respect to the second reflective surface at an edge of the window.

19. The projection display of claim 15, wherein:
the light path combining unit comprises first and second dichroic filters disposed in a V shape to reflect the first and third light beams, respectively;
the first and second light source units are disposed on a reflection side and a transmission side, respectively, of the first dichroic filter; and
the third light source unit is disposed on a reflection side of the second dichroic filter.

20. The projection display of claim 19, further comprising at least one condensing lens to condense the first through third light beams and to propagate the condensed light beams to the integrator.

21. The projection display of claim 20, wherein at least one condensing lens is disposed at each of spaces between the first light source unit and the first incidence surface, between the second light source unit and the second incidence surface, and between the third light source unit and the third incidence surface.

22. The projection display of claim 15, wherein the optical modulator is a digital micromirror device (DMD).

* * * * *